J. C. COSS.
VEHICLE TOP JOINT BRACE.
APPLICATION FILED AUG. 28, 1908.

943,655.  Patented Dec. 21, 1909.

Witnesses:
F. C. Valentine
W. G. Rinehart

Inventor:
James C. Coss
by Obed C. Billman
his attorney.

UNITED STATES PATENT OFFICE.

JAMES C. COSS, OF CLEVELAND, OHIO.

VEHICLE-TOP-JOINT BRACE.

943,655.  Specification of Letters Patent.  Patented Dec. 21, 1909.

Application filed August 28, 1908. Serial No. 450,617.

*To all whom it may concern:*

Be it known that I, JAMES C. Coss, a citizen of the United States, residing at Cleveland, in the county of Cuyahoga and State of Ohio, have invented certain new and useful Improvements in Vehicle-Top-Joint Braces, of which the following is a specification.

My invention relates to improvements in vehicle top-joint braces, the primary object of the invention being to provide a generally-improved smooth working interchangeable or reversible top-joint brace of this class having the following named objects or advantages over the ordinary top-joint brace in common use: First: To provide an improved brace knuckle joint adapted to maintain the brace members in perfect alinement and prevent rattle. Second: To provide adjusting and nut locking means at the eye ends of the brace members whereby said brace members may be adjusted to meet necessary requirements for the perfect working of, and necessary tension at, the improved brace knuckle joint, thus preventing strain and rattle.

With these ends in view, the invention consists in the novel construction, arrangement, and combination of parts, hereinafter described, illustrated in the accompanying drawings, and particularly pointed out in the appended claims.

Figure 1:
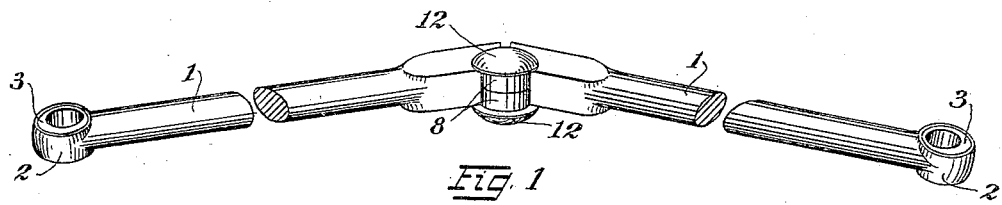
Figure 2:
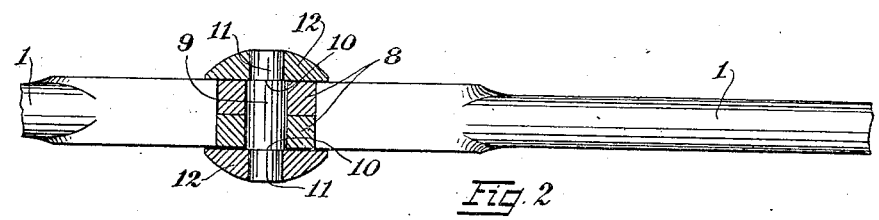
Figure 3:
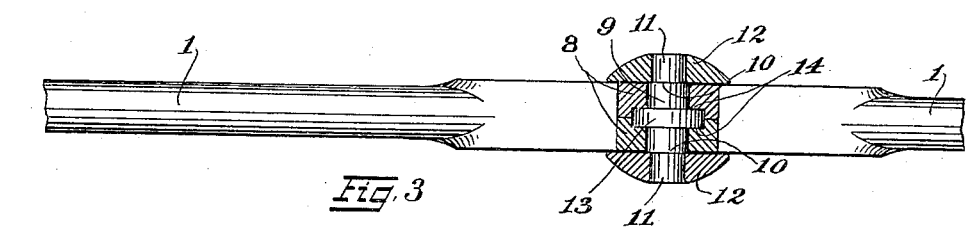
Figure 4:
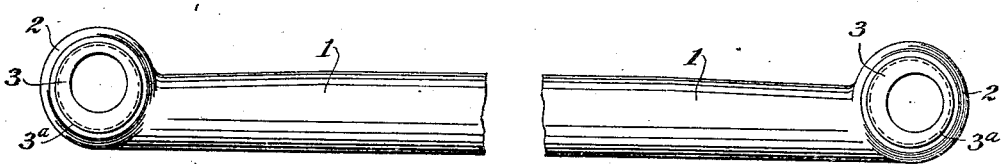
Figure 5:
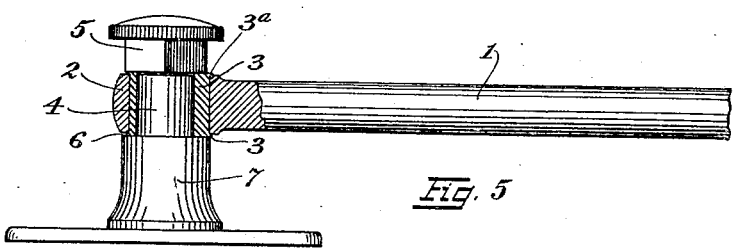

Referring to the drawings, Figure 1, is a perspective view of knuckle jointed brace members embodying my invention. Fig. 2, a longitudinal cross sectional view of the improved brace knuckle or half joint. Fig. 3, a similar view of a modified form of same. Fig. 4, a detail view of the eye ends of the brace members provided with adjustable eccentric bushings adapted to coöperate with the bearing studs and top nuts in providing improved adjusting and nut locking means. Fig. 5, a detail plan view, partly in section, of the eccentric bushing and eye end of a brace member attached to a top-prop bearing-stud and secured by a top-prop nut comprising the improved adjusting and nut locking means.

Similar numerals of reference designate like parts throughout all the figures of the drawings.

The improved top-joint brace comprises brace members 1, preferably of oval shaped body contour, and provided with eye-ends 2. The eye-ends are adapted to receive and contain eccentric bushings 3, adjustably mounted upon bearing-studs 4, by means of top-prop-nuts 5, (see Fig. 5). The eccentric bushings 3, form the bearings for the eye-ends 2, and are locked in their adjusted position by means of the top-prop-nuts 5. The sides of the bushing preferably extend or project slightly beyond the longitudinal planes of the sides of the eye-end so that the top-prop nut 5, when drawn down will abut or contact with the face side of the bushing, the opposite or rear side of the bushing abutting against the shoulder 6, of the top-prop 7.

As the shoulder 6, and the nut 5, do not come into pinching contact with the eye-end 2, the latter moves freely thereon, and by reason of the construction described and shown the eccentric bushing, when adjusted, together with the top-nut 5, may be securely locked in their adjusted position forming a practical "top-prop lock-nut." The outer peripheral edges of the face and rear sides of the bushings are preferably upset or turned over slightly forming slight peripheral flanges $3^a$, which are adapted to keep the eye-end of the brace member centrally located on the eccentric bushing.

The improved brace knuckle joint or "half joint" comprises two overlapping knuckle leaves 8, provided with bearing-openings to receive and contain a bearing-pin 9, said bearing-pin being provided with shoulders 10, flush with, or, preferably, extending slightly beyond the longitudinal plane of the sides of said knuckle leaves 8, and terminating in reduced stem ends 11, carrying washer bearing-heads 12. The washer bearing-heads are adapted to rest against and be securely supported upon the shoulders 10, by riveting, welding, or other suitable securing means, and, it will be observed that by reason of the manner of mounting and securing said bearing-pin 9, and the washer heads the latter will loosely abut against the sides of the knuckle leaves 8, but do not pinch or bind the same together, and, consequently, provide a smooth working joint in which the washer-heads 12, are not liable to be twisted or otherwise disarranged on the bearing-pin 9, as is the case where they are riveted directly against the knuckle leaves without the intervention of the separating shoulders 10.

As a further means of providing a smooth working joint and keeping the parts in their proper relative position, and more particularly for maintaining the brace members in alinement, the bearing-pin may be provided with an inner peripheral shoulder bearing 13, working in annular off-set bearing grooves 14, formed on the inner or abutting sides of the knuckle leaves 8, as shown in Fig. 3, of the drawings.

From the foregoing description, taken in connection with the accompanying drawings, the operation and advantages of my invention will be readily understood.

Having thus described my invention, what I claim and desire to secure by Letters Patent is,—

1. A vehicle top-joint brace, comprising brace members pivotally connected at their knuckle ends with a bearing-pin provided with shoulders extending beyond the planes of said knuckle ends and washer bearing-heads supported upon said shoulders by riveting the ends of said bearing-pin.

2. A vehicle top-joint brace, comprising brace members carrying in their knuckle ends a bearing-pin provided with reduced stem ends forming shoulders extending beyond said knuckle ends, and washer bearing-heads mounted on said shoulders and riveted on said reduced end portions.

3. A vehicle top-joint brace, consisting of brace members provided with a knuckle joint comprising overlapping knuckle leaves provided with bearing openings, a bearing-pin mounted in said knuckle leaves and provided with reduced stem ends extending beyond the planes of said knuckle leaves, and washer heads riveted on said reduced stem ends.

4. A vehicle top-joint brace, comprising brace members having their leaf ends pivotally connected by means of a double headed bearing-pin provided with an inner peripheral shoulder bearing interposed between said leaf ends.

5. A vehicle top-brace joint, comprising overlapping brace-leaf ends carrying a bearing-pin provided with an inner peripheral shoulder bearing and heads mounted on reduced stem ends extending beyond the planes of said leaf ends.

6. In a vehicle top-joint brace, a top-prop bearing-stud provided with a shoulder, a brace member provided with an eye-end, an eccentric bushing mounted in said eye-end abutting against said shoulder and extending beyond the sides of said eye-end, and a top-prop nut threaded on said bearing-stem and abutting against said eccentric bushing.

7. In a vehicle top-joint brace, a brace adjusting and top-prop nut locking means comprising a top-prop shouldered bearing-stud a brace member provided with an eye-end, an eccentric bushing mounted in said eye-end and on said bearing-stud and extending beyond the sides of said eye-end, and a top-prop nut threaded on said bearing stud and abutting against said eccentric bushing.

8. In a vehicle top-joint brace, brace members provided with eye-ends and an intermediate brace-joint, eccentric bushings mounted in said eye-ends and projecting beyond the sides of said eye-ends, top-prop bearing-studs extending through said eccentric bushings and provided with shoulders abutting against the rear faces of said bushings, and top-prop nuts threaded on the projecting ends of said bearing-studs and abutting against the front faces of said bushings.

9. In a vehicle top-joint brace, brace members having eye and leaf ends, said leaf-ends being connected by a bearing-pin provided with heads abutting against shoulders on said pin extending beyond the planes of said leaf-ends, eccentric bushings mounted in said eye-ends, and extending beyond the sides of said eye-ends, top-prop bearing-studs extending through said eccentric bushings, and top-prop nuts threaded on the extended ends of said bearing-studs and abutting against the front faces of said bushings.

10. In a vehicle top-joint brace, the combination with brace members provided with eye-ends and a half joint comprising overlapping leaf ends provided with bearing-openings, a bearing-pin mounted in said bearing-openings and having reduced stem ends carrying washed bearing-heads; of eccentric bushings mounted in said eye-ends and extending beyond the sides thereof, top-prop bearing-studs carrying said eccentric bushings, and top-prop nuts threaded on said bearing-studs and abutting against and locking said eccentric bushings in their adjusted positions.

11. A vehicle top-brace joint, comprising brace members having overlapping leaf-ends pivotally connected by a double headed bearing-pin having an inner peripheral shoulder bearing, said leaf-ends having their abutting sides provided with annular off-set bearing grooves receiving and containing said inner peripheral shoulder bearing.

In testimony whereof I have affixed my signature, in presence of two witnesses.

JAMES C. COSS.

Witnesses:
O. C. BILLMAN,
GEO. H. BILLMAN.